United States Patent
Zhang et al.

(10) Patent No.: US 9,438,643 B2
(45) Date of Patent: Sep. 6, 2016

(54) MULTI-DEVICE CONFERENCE PARTICIPATION

(71) Applicant: Cisco Technology, Inc., San Jose, CA (US)

(72) Inventors: Dong Zhang, Hefei (CN); Ling Zhang, Hefei (CN); Guang Xu, Hefei (CN); Yongze Xu, Hefei (CN); Zhiliang Wang, Hefei (CN)

(73) Assignee: Cisco Technology, Inc., San Jose, CA (US)

( * ) Notice: Subject to any disclaimer, the term of this patent is extended or adjusted under 35 U.S.C. 154(b) by 30 days.

(21) Appl. No.: 14/597,241

(22) Filed: Jan. 15, 2015

(65) Prior Publication Data

US 2016/0212181 A1    Jul. 21, 2016

(51) Int. Cl.
*H04N 7/14* (2006.01)
*H04L 29/06* (2006.01)
*H04N 7/15* (2006.01)

(52) U.S. Cl.
CPC ....... *H04L 65/1089* (2013.01); *H04L 65/4015* (2013.01); *H04N 7/15* (2013.01)

(58) Field of Classification Search
CPC ....................................................... H04N 7/14
USPC ......... 348/14.01, 14.02, 14.03, 14.07, 14.08, 348/14.12
See application file for complete search history.

(56) References Cited

U.S. PATENT DOCUMENTS 6,717,556 B2   4/2004 Asahi et al.
2014/0028778 A1*  1/2014 Shapiro ................... H04L 67/02
                                                         348/14.01

OTHER PUBLICATIONS

Howley, Daniel P., Face-Off: IPad Air vs Microsoft Surface 2, Dec. 30, 2013 can be seen at: http://blog.laptopmag.com/ipad-air-vs-surface-2.
Mobile Interactive Systems(MINT), Groupix—Grouping Multiple Android Devices to One Screen (posted Mar. 21, 2014) can be seen at: http://mint.fh-hagenberg.at/?p=1962.
Vidyoworks, Vidyo—HD Video Conferencing, 2014 can be sen at: http://www.vidyo.com/.

* cited by examiner

*Primary Examiner* — Olisa Anwah
(74) *Attorney, Agent, or Firm* — Samuel M. Katz (57) ABSTRACT

In one embodiment a method includes connecting a primary video conference client device (PVCCD) to a video conference session; allocating: at least a first presentation segment of the video conference session to be presented by the PVCCD, and also allocating at least a second presentation segment of the video conference session to be presented by at least one secondary video conference client device (SVCCD), receiving a data stream associated with at least the first presentation segment, and presenting the first presentation segment on the PVCCD.

19 Claims, 5 Drawing Sheets

MULTI-DEVICE CONFERENCE PARTICIPATION

FIELD OF THE INVENTION

The present invention generally relates to video conference participation on a client device.

BACKGROUND OF THE INVENTION

Video conference systems are known in the art. Such systems typically comprise a server which manages video conference sessions for participating client devices. The client devices enable users that are at least in part located remotely from each other to communicate with each other. In order to participate in a video conference session, client devices typically comprise at least a processor, a video camera, a display screen, a microphone and a speaker. Common examples of such client devices are suitably configured personal computers, smartphones, computer tablets, laptop computers and dedicated video conference rooms.

BRIEF DESCRIPTION OF THE DRAWINGS

The present invention will be understood and appreciated more fully from the following detailed description, taken in conjunction with the drawings in which.

DESCRIPTION OF EXAMPLE EMBODIMENTS

Overview

A method includes connecting a primary video conference client device (PVCCD) to a video conference session; allocating: at least a first presentation segment of the video conference session to be presented by the PVCCD, and also allocating at least a second presentation segment of the video conference session to be presented by at least one secondary video conference client device (SVCCD), receiving a data stream associated with at least the first presentation segment, and presenting the first presentation segment on the PVCCD.

Another method includes: connecting a video conference client device to a video conference session, designating the connected video conference client device as a secondary video conference client device (SVCCD), receiving a presentation segment allocation from a primary video conference client device (PVCCD), wherein the presentation segment allocation indicates at least a presentation segment of the video conference session to be presented on the SVCCD, receiving a data stream including at least the presentation segment, and presenting the presentation segment on the SVCCD.

Detailed Description of Example Embodiments

It will be appreciated that it is not uncommon for a participant in a video conference to be in possession of two or more different devices that may be suitable for use as video client devices. For example, a given participant may have both a desktop computer and a smartphone; another participant may have a laptop computer and a computer tablet; another participant may have a personal computer, a computer tablet and a smartphone; yet another participant may have a smartphone while participating in a video conference room; and so on.

It will also be appreciated that that the size of a client device's display screen may vary, generally as a function of the size of the device itself. For example, when measured diagonally, smartphones may typically be configured with display screens of approximately four to six inches; computer tablets may typically be configured with display screens of approximately seven to ten inches; laptop computers may typically be configured with display screens of approximately fifteen to twenty inches; personal computers may typically be connected to display screens of twenty inches or more; and video conference rooms may typically be configured with one or more wall mounted units, each of which may be several feet in size. It will be appreciated that the screen sizes discussed hereinabove may be exemplary; some client devices may be configured with display screens of other sizes.

The positioning and functionality of the video camera may also vary depending on the client device. Video cameras mounted on personal computers or installed in video conference rooms may provide benefit from fixed, stable camera platforms. In contrast, mobile devices such as smartphones, computer laptops and computer tablets may provide an inherently less stable camera platform subject to the movement of the client device itself. Similarly, different client devices may be equipped with video cameras providing different levels of resolution from the output video.

It will be similarly appreciated that there may be other differences between client devices such as, for example, quality and/or number of speakers, processing power of the client device, and/or available bandwidth or receipt and/or transmission of audio and/or video signals.

Figure 1:
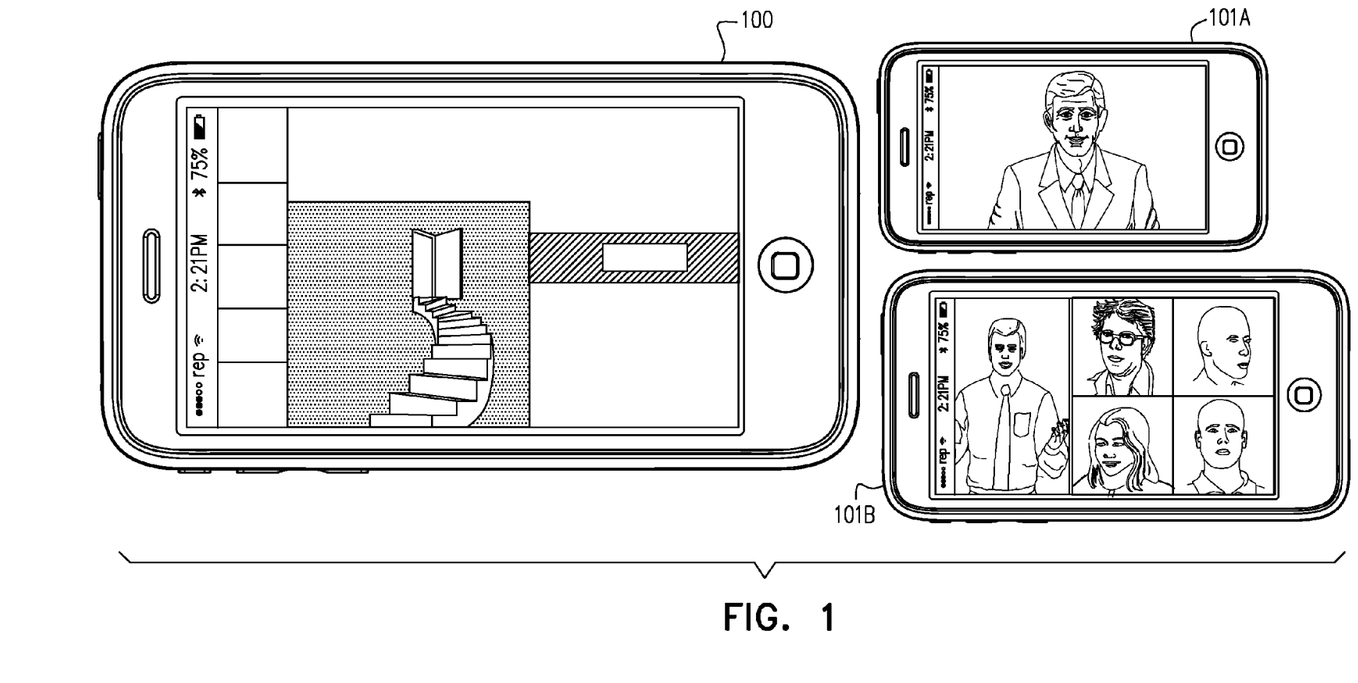
FIG. 1 is a pictorial illustration of multiple exemplary video conference clients, configured and operative in accordance with embodiments of the present invention.

The inventors of the present invention have realized that a user's experience while participating in a video conference session may be improved by enabling the user to simultaneously use two or more client devices to participate in the video conference session. Reference is now made to FIG. 1 which illustrates an exemplary multiple video conference client configuration, operative in accordance with embodiments of the present invention.

FIG. 1 depicts primary video conference client device (PVCCD) 100 and two secondary video conference client devices (SVCCDs) 101 participating together in a video conference. PVCCD 100 and SVCCDs 101 may be any suitably configured client devices such as, for example, personal computers, smartphones, computer tablets, and/or laptop computers. PVCCD 100 and SVCCDs 101 as shown may be participating in the video conference session. As shown, PVCCD 100 is allocated to the video display of a presentation being presented to participants of the video conference session. SVCCD 101A is allocated to the video display of the presenter of the presentation displayed on PVCCD 100. SVCCD 101 is allocated to the video display of the other, non-presenting, participants of the video conference session.

It will be appreciated that it may be inconvenient to show the video displays of PVCCD 100 and SVCCD 101 simultaneously on the same client device; the allocation of the different parts, or "segments", of the video conference session to different client devices may therefore serve to improve the user experience of the participant in the video conference session. It will also be appreciated that the relative sizes of devices 100 and 101 as depicted in FIG. 1 may represent an exemplary configuration, where the user may have configured the largest client device, i.e. PVCCD 100, to display what may presumably be the largest or most complicated video segment. Similarly the second largest client device, i.e. SVCCD 101B, may have been configured to display what may presumably be the next largest or most complicated video segment, i.e. the other participants of the video conference session. It will, however, be appreciated that the present invention may also support other allocations of video segments among PVCCD 100 and SVCCDs 101. It will similarly be appreciated that the present invention may also support other combinations of absolute or relatively sized client devices.

Figure 2:
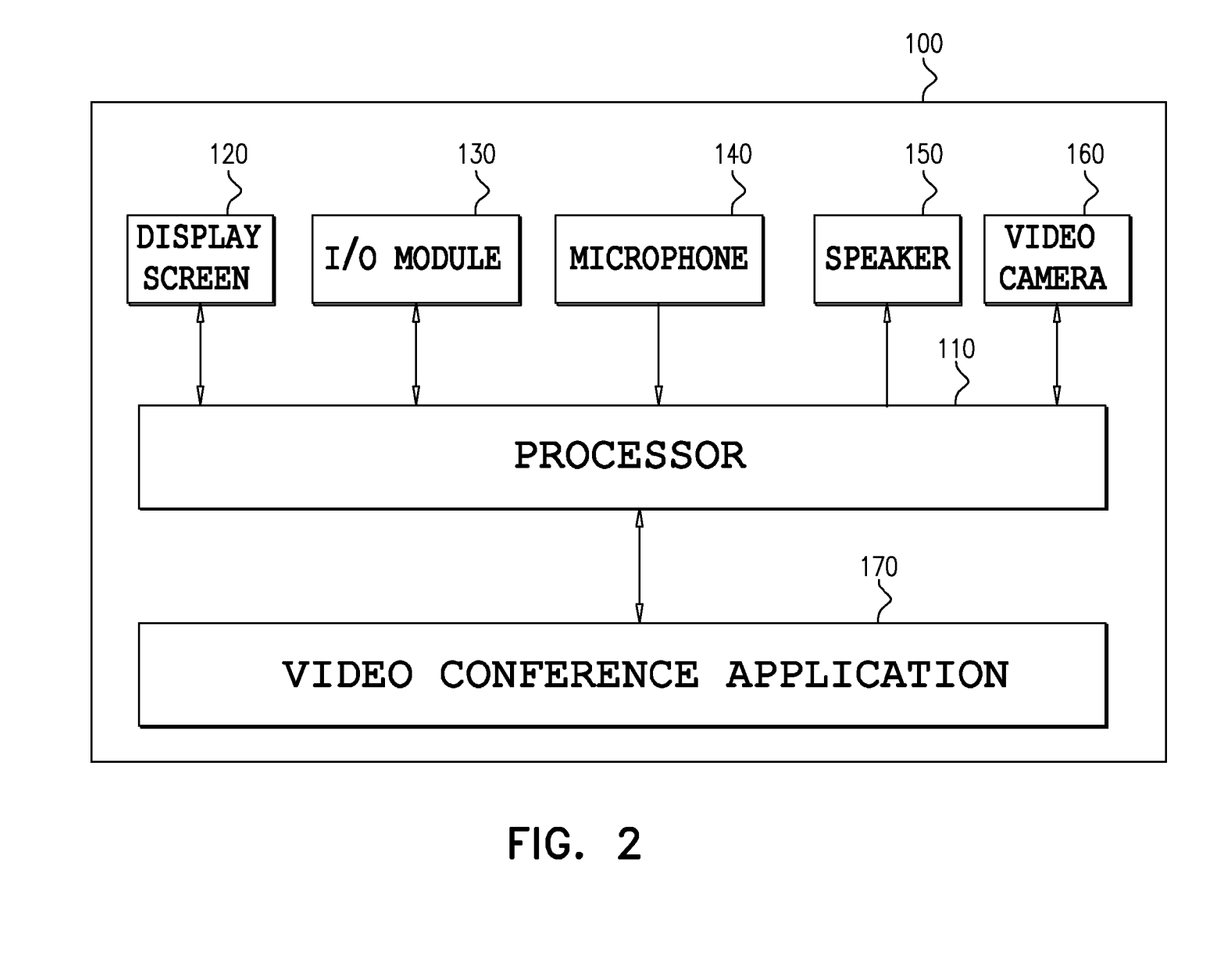
FIG. 2 is a block diagram illustration of an exemplary primary video conference client device from the embodiment of FIG. 1.

Reference is now made to FIG. 2 which is a block diagram illustration of an exemplary PVCCD 100. PVCCD 100 may be any suitable computing device operative to facilitate a user's participation in a video conference session. For example, PVCCD 100 may be a personal computer, a smartphone, a tablet computer, or a laptop computer, etc. It will be appreciated that PVCCD 100 comprises hardware and software components, such as are well-known in the art. PVCCD 100 comprises: at least one processor 110; display screen 120; Input/output (I/O) module 130; microphone 140; speaker 150, video camera 160 and video conference application 170. It will be appreciated that PVCCD 100 may comprise other components that are not depicted in FIG. 2.

It will be appreciated that PVCCD 100 may comprise more than one processor 110. For example, one such processor 110 may be a special purpose processor operative to provide the functionality of video conference application 170, i.e. to facilitate a user's participation in a video conference session.

Display screen 120 may be a display screen operative to display views generated by applications such as, for example, video conference application 170, and/or the operating system (not shown) of computing device 100. It will be appreciated that depending on the configuration of PVCCD 100, display screen 120 may be a touchscreen, operative to receive input from a user via UI gestures entered in contact with, or in close proximity to, display screen 120. I/O module 130 may be a software or hardware component such as, for example, a transceiver, operative to transmit and receive data at least in support of video conference application 170.

It will be appreciated that video conference application 170 may be an application implemented in software and/or hardware on PVCCD 100. Video conference application 170 is configured to use display screen 120, I/O module 130, microphone 140, speaker 150, and video camera 160 to facilitate a user's participation in a video conference session. It will be appreciated that the depiction of video conference application 170 as an integrated component of PVCCD 100 may be exemplary. PVCCD 100 may also be configured to receive some or all of the functionality of video conference application 170 as a service provided by other computing devices accessed via a network such as the Internet.

The designation of a given client device as PVCCD 100 or SVCCD 101 may be configurable. It will therefore be appreciated that the configuration of a PVCCD 100 and a SVCCD 101 may be generally similar.

Figure 3:
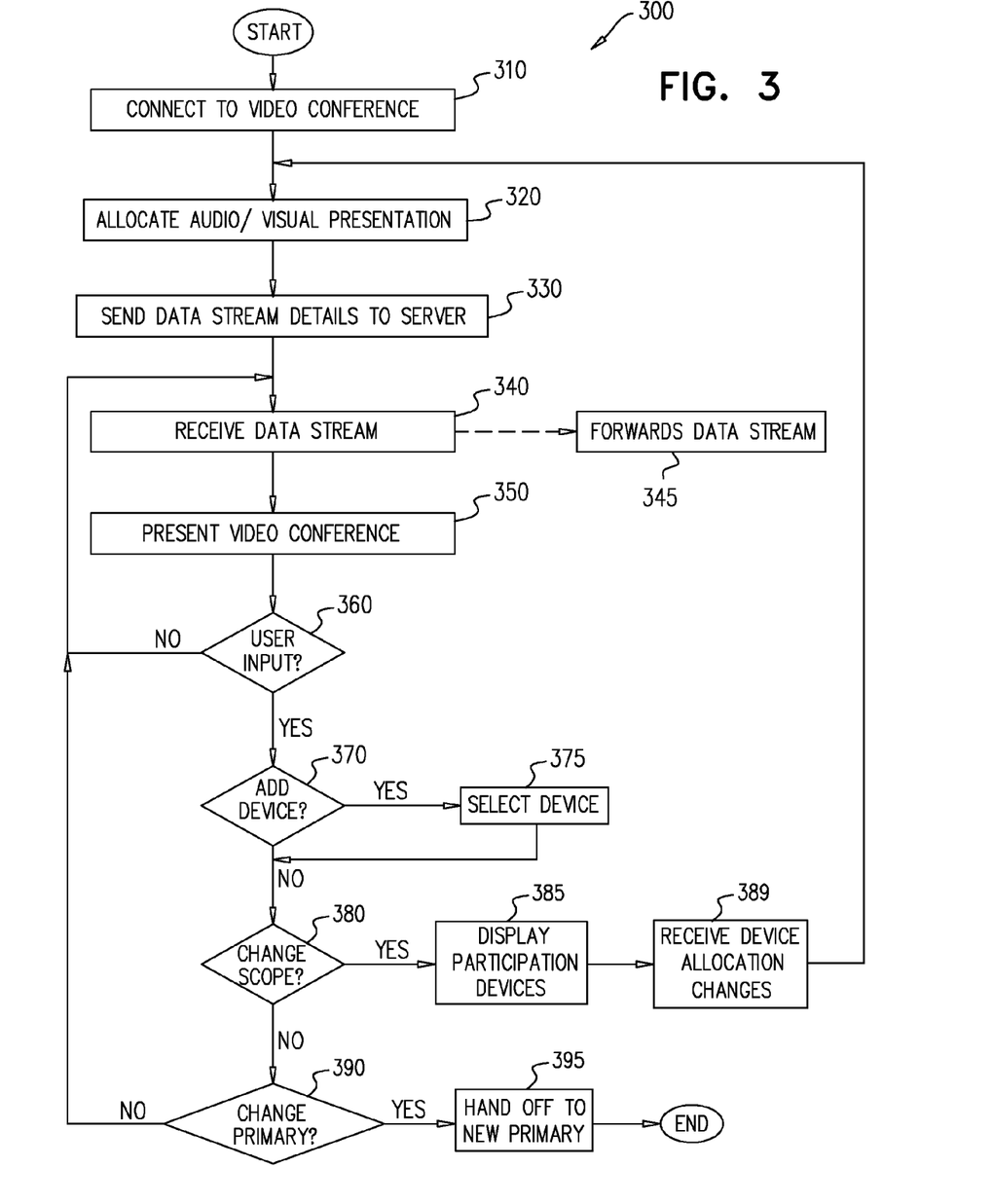
FIG. 3 which is a flow-chart of a video conference client allocation process to be performed by the primary video conference client device of FIGS. 1 and 2.

Reference is now also made to FIG. 3 which illustrates a video conference client allocation process 300 to be performed by PVCCD 100 (FIG. 2) in accordance with embodiments of the present invention. Video conference application 170 may employ I/O module 130 to connect (step 310) to a video conference. It will be appreciated that as discussed hereinabove, a user joining a video conference may be in possession of more than one suitable client device. By default, video conference application 170 may be configured to designate the first such client device to connect to the session as PVCCD 100. As will be discussed hereinbelow, this designation may be changed based on user input.

Video conference application 170 may allocate (step 320) segments of an audio/visual presentation to be presented to the user of PVCCD 100. This allocation may represent the allocation of the segments of the video conference session between PVCCD 100 and one or more SVCCDs 101. For example, as per the exemplary embodiment of FIG. 1, video conference application 170 may allocate a shared desktop presentation to be displayed on PVCCD 100; the presenting participant on SVCCD 101A; and the other participants on SVCCD 101B. It will however be appreciated that when first connecting to a video conference session, i.e. the first time step 320 is executed after connecting to the session in step 310, there may be no SVCCDs 101 with which to share the presentation of the video conference session. Accordingly, the first time step 320 is executed, the entire presentation may be allocated to PVCCD 100.

Video conference application 170 may employ I/O module 130 to send (step 330) data stream details of the allocation to the video conference server. It will be appreciated that PVCCD 100 and SVCCDs 101 may have limited bandwidth available for the receipt and transmission of the data stream associated with a video conference session. Accordingly, the details provided in step 330 may be employed by the video conference server to allocate which data is sent to which device. For example, as per the exemplary embodiment of FIG. 1, based on the details sent in step 330, the video conference server may transmit the data associated with the shared desktop presentation to PVCCD 100; the data associated with the presenting participant to SVCCD 101A; and the data associated with the other participants to SVCCD 101B.

I/O module 130 may receive (step 340) the data stream from the video conference server as per an allocation based on the data stream details sent in step 330. It will be appreciated that PVCCD 100 may be configured to receive a data stream on behalf of a SVCCD 101. For example, if PVCCD 100 and SVCCDs 101 either physically or virtually share a single connection with the video conference server (e.g. are all connected to the Internet via the same WiFi access point, or are actually tethered together), it may be beneficial to receive their respective allocated data streams from a single transmission. In such a case, PVCCD 100 may forward (step 345) one or more data streams to SVCCD(s) 101 as necessary. It will be appreciated however, that PVCCD 100 may alternatively receive its allocated data stream from an SVCCD 101 in step 340.

It will be appreciated that the allocation of step 320 may also address non-display oriented resources such as microphone 140, speaker 150 and video camera 160. Video conference application 170 may present (step 350) the relevant allocated portion of the video conference session on PVCCD 100 using display screen 120, microphone 140, speaker 150 and video camera 160 as necessary per the allocation determined in step 320. Process 300 may loop from step 340 through step 360 to facilitate the continuing presentation of the video conference session.

As described hereinabove, when process 300 is first executed, there may be only one participating device, which by default may be designated as PVCCD 100. The initial allocation as performed in step 320 may therefore be for the entire video conference session to be presented on a single device, i.e. PVCCD 100. Process 100 may be configured to detect user input (step 360) as a request to add one or more additional devices (step 370) to a given video conference session.

If such a request is detected, a device may be selected (step 375) and added as a SVCCD 101. Video conference application 170 may employ any suitable method to facilitate selecting the device. For example, video conference application 170 may display a list of available devices known to PVCCD 100, either based on previous registration and/or as detected using known methods for identifying devices in close proximity and/or on the same network. Alternatively or in addition, an SVCCD 101 may connect directly to the video conference session as in step 310, and the SVCCD 101 may be added to the video conference session without requiring user intervention. In such a case, video conference application 170 may be configured to present either a visual and/or audio alert to inform the user that another device is now available to share the presentation of the video conference session.

The user input may represent a request to change the presentation scope (step 380), i.e. a request to change the allocation of the overall audio/visual presentation as set in step 320. It will be appreciated that a single user input may qualify for both steps 370 and 380; i.e., the same user input may be employed to both request the selection of a new device, and to include it in a changed presentation scope.

Video conference application 170 may display (step 385) a list of participating devices and receive (step 389) one or more device allocation changes from the user. For example, using the embodiment of FIG. 1, after SVCCDs 101A and 101B were added to the video conference session as per step 375, the user may have then requested to allocate display of the presenting user on SVCCD 101A, and the non-presenting participants on SVCCD 101B. After step 389 has been executed, control may return to step 320 where video conference application 170 may allocate the presentation as per the user's request and processing may continue as discussed hereinabove.

It will be appreciated that any suitable method may be used to input specific allocation requests in step 389. For example, the video conference server and/or video conference application 170 may define different audio/visual data feeds as segments of the video conference session. Video conference application 170 may display lists of the available devices and the segments available for allocation. A mouse, pointing device or key combination may be employed by the user to select and match devices to segments from the lists. Alternatively or in addition, if display screen 120 is a touchscreen, "drag and drop" methods may be employed to match devices to segments for presentation.

It will similarly be appreciated that steps 380 through 389 may also be employed to remove an SVCCD 101 and/or reallocate its associated presentation segments. For example, step 380 may alternatively or in addition be configured to detect a user request to remove an SVCCD 101 from the video conference session. The specific SVCCD 101 to be removed may then be selected from among currently allocated SVCCDs 101 in step 385, and in step 389 the allocation may be adjusted in light of the now removed SVCCD 101.

The user input may represent a request to change the primary device (step 390), i.e. to designate a new PVCCD 100 from among the participating SVCCDs 101, and to redesignate the previous PVCCD 100 as a SVCCD 101. If there is such a request to change the primary device, video conference server 170 may hand off (step 395) to the new PVCCD 100 and process 300 may end. The hand off procedure may include, for example, forwarding participation and allocation details to the new PVCCD 100 and/or notifying the video conference server.

It will be appreciated that video conference application 170 may support user input that may not necessarily be directly related to the allocation of resources for the presentation of the video conference session. Non-limiting examples of such input may include user audio participation, local settings adjustments, random mouse movements, etc. In such cases, i.e. where the results of steps 370. 380 and 390 are "No", control may return to step 340.

It will be appreciated by those of skill in the art that the order of the steps of process 300 may be exemplary; other processing flows providing generally the same functionality may also be supported by the present invention. Particularly, steps 370, 380, and 390 may be re-ordered within the scope of the present invention. It will similarly be appreciated that, alternatively or in addition, step 320 may be performed offline (i.e. when video conference application 170 is not currently engaged in presenting a video conference session) or based on allocations made on behalf of previous video conference sessions.

Figure 4:
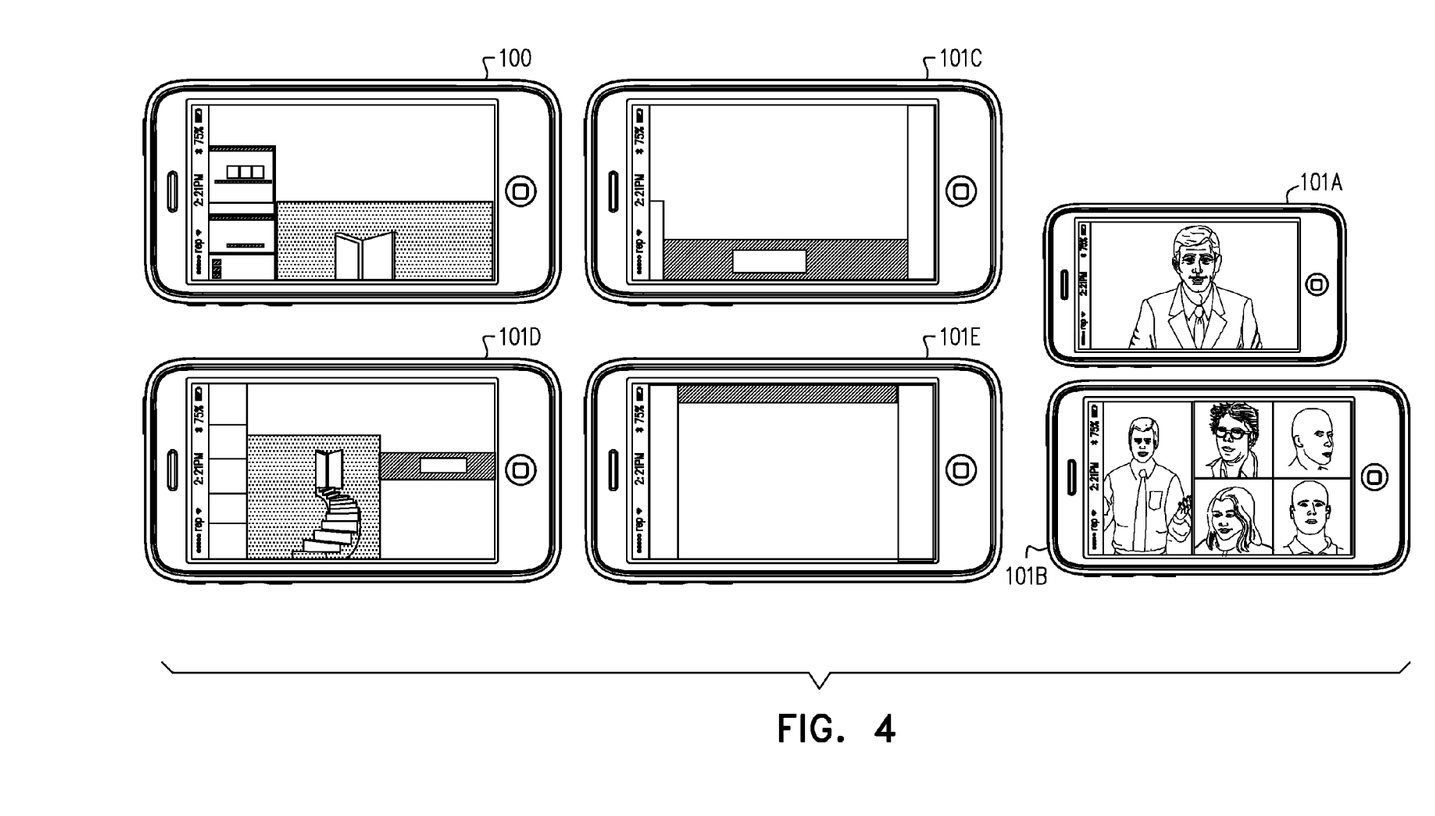
FIGS. 4 and 5 are pictorial illustrations of exemplary configurations of multiple video conference clients in accordance with embodiments of the present invention.

It will also be appreciated that video conference application 170 may support a more granular allocation. For example, the shared desktop presentation displayed by PVCCD 100 in the exemplary embodiment of FIG. 1 may be allocated to multiple devices. As shown in FIG. 4, to which reference is now made, instead of the entire presentation being displayed on PVCCD 100, the presentation may be segmented and some or all of the segments displayed on SVCCDs 101C, 101D and 101E, in addition to PVCCD 100. Such segmentation may be implemented as a feature of video conference application 170, i.e. to automatically divide an existing display segment into a multiplicity of segments. Alternatively or in addition, a mouse or pointing device may be employed by the user to further define the segments. Similarly, is display screen 120 is a touchscreen, user interface gestures may be used to further define the segments.

Figure 5:
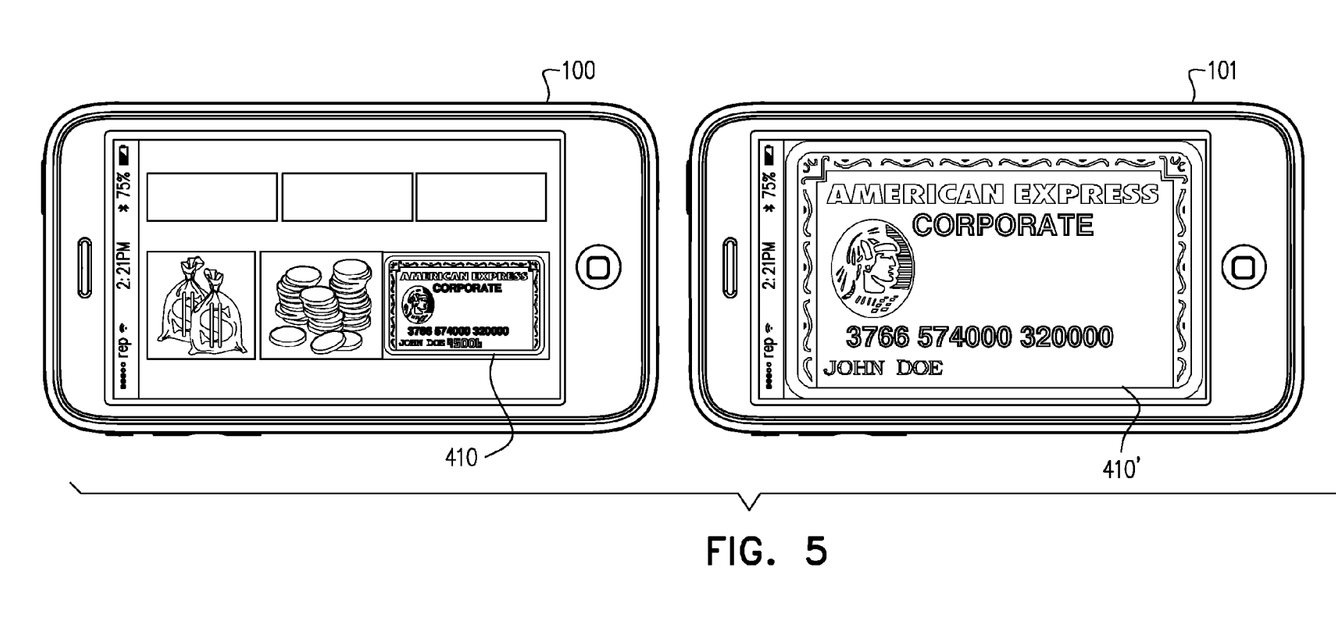

It will also be appreciated that there may be overlap between the allocation of a given segment of the overall presentation between two or more devices. For example, a segment may be shown on one device, and the same segment shown with a different size and/or resolution on a second device. Reference is now made to FIG. 5, which illustrates an exemplary presentation of a video conference session. As shown in FIG. 5, the display on PVCCD 100 may represent a shared desktop presentation. The presentation comprises a multiplicity of display panels including display panel 410. In accordance with embodiments of the present invention, display panel 410 may be defined as a presentation segment and also displayed on SVCCD 101 as display panel 410'.

It will also be appreciated that process 300 may also support the allocation of non-display resources. For example, process 300 may also be used to allocate the use or non-use of microphone 140, speaker 150 and/or video camera 160 on participating PVCCD 100 and SVCCDs 101. For example, as per the exemplary embodiment of FIG. 1, the overall audio/video presentation of the video conference session may be allocated such that video camera 160 of PVCCD may be employed to provide a video feed to the video conference server; microphone 140 of SVCCD 101A may be employed to provide an audio feed; and speaker 150 of SVCCD 101B may be employed to provide the audio to the user.

It will similarly be appreciated that such allocations may be shared among devices. For example, speakers 150 of two or more devices may be employed to provide a stereo experience.

It is appreciated that software components of the present invention may, if desired, be implemented in ROM (read only memory) form. The software components may, generally, be implemented in hardware, if desired, using conventional techniques. It is further appreciated that the software components may be instantiated, for example: as a computer program product or on a tangible medium. In some cases, it may be possible to instantiate the software components as a signal interpretable by an appropriate computer, although such an instantiation may be excluded in certain embodiments of the present invention.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited by what has been particularly shown and described hereinabove. Rather the scope of the invention is defined by the appended claims and equivalents thereof:

What is claimed is:

1. A method comprising:
    connecting a primary video conference client device (PVCCD) to a video conference session;
    allocating:
        at least a first presentation segment of said video conference session to be presented by said PVCCD, and
        at least a second presentation segment of said video conference session to be presented by at least one secondary video conference client device (SVCCD);
    enabling user selection of at least one SVCCD from among available video conference client devices;
    receiving a data stream associated with at least said first presentation segment; and
    presenting said first presentation segment on said PVCCD.

2. The method according to claim 1 wherein at least one of said presentation segments is a visual display from said video conference session.

3. The method according to claim 1 wherein at least one of said presentation segments is audio from said video conference session.

4. The method according to claim 1 and wherein said receiving comprises:
    receiving said data stream, wherein said data stream is also associated with said second presentation segment; and
    forwarding a portion of said received data stream to said SVCCD, wherein said forwarded portion is associated with said second presentation segment.

5. The method according to claim 1 wherein at least a portion of said first presentation segment and a portion of said second presentation segment are associated with a same visual display to be presented in different resolutions.

6. The method according to claim 1 and also comprising:
    forwarding details of at least said second presentation segment to a video conference server associated with said video conference session, wherein said received data stream is not associated with said second presentation segment.

7. The method according to claim 1 wherein said allocating comprises:
    performing said allocating in accordance with allocations performed for previous video conference sessions.

8. The method according to claim 1 wherein said allocating comprises:
    performing said allocating in accordance with previously entered user preferences.

9. The method according to claim 1 wherein said allocating comprises:
    designating another video conference client device as said PVCCD; and
    redesignating previous said PVCCD as said SVCCD.

10. The method according to claim 1 and also comprising:
    adding an available video conference client device as said SVCCD.

11. The method according to claim 1 and also comprising:
    removing at least one said SVCCD from said video conference session; and
    performing said allocating without said removed SVCCD.

12. A method comprising:
    connecting a video conference client device to a video conference session;
    designating said connected video conference client device as a secondary video conference client device (SVCCD) in accordance with a selection of said video conference client device as said SVCCD on an associated primary video conference client device (PVCCD);
    receiving a presentation segment allocation from said PVCCD wherein said presentation segment allocation indicates at least a presentation segment of said video conference session to be presented on said SVCCD;
    receiving a data stream comprising at least said presentation segment; and
    presenting said presentation segment on said SVCCD.

13. The method according to claim 12 wherein said presentation segment is a visual display from said video conference session.

14. The method according to claim 12 wherein said presentation segment is audio from said video conference session.

15. The method according to claim 12 wherein said receiving said data stream comprises:
    receiving said data stream from said PVCCD.

16. The method according to claim 12 wherein said receiving said data stream comprises:
    receiving said data stream from a video conference server, wherein said video conference server is associated with said video conference session.

17. The method according to claim 12 wherein said data thread also comprises presentation data not allocated for presentation on said SVCCD.

18. The method according to claim 12 and also comprising:
    receiving a handover request initiated on said PVCCD; and
    redesignating said SVCCD as said PVCCD.

19. A primary video conference device (PVCCD) comprising:
- an input/output module operative to send and receive data associated with a video conference session;
- a display screen operative to at least display a presentation of said data;
- a processor; and
- a video conference application to be executed by said processor and configured to:
- connect said PVCCD to said video conference session;
- allocate:
  - at least a first presentation segment of said video conference session to be presented on said display screen, and
  - at least a second presentation segment of said video conference session to be presented by at least one secondary video conference client device (SVCCD);
- enable user selection of at least one SVCCD from among available video conference client devices;
- receive via said I/O module a data stream associated with at least said first presentation segment; and
- present said first presentation segment on said display screen.

* * * * *

UNITED STATES PATENT AND TRADEMARK OFFICE
CERTIFICATE OF CORRECTION

PATENT NO. : 9,438,643 B2  
APPLICATION NO. : 14/597241  
DATED : September 6, 2016  
INVENTOR(S) : Dong Zhang et al.

Page 1 of 1

It is certified that error appears in the above-identified patent and that said Letters Patent is hereby corrected as shown below:

On the Title Page

In item (56), Other Publications, in Column 2, Line 1, "IPad" to read as --Apple IPad--.

In item (56), Other Publications, in Column 2, Line 7, "sen" to read as --seen--.

In the Claims

Column 8, Line 61, Claim 17, "thread also" to read as --stream also--.

Signed and Sealed this
Twelfth Day of December, 2017

Joseph Matal
*Performing the Functions and Duties of the*
*Under Secretary of Commerce for Intellectual Property and*
*Director of the United States Patent and Trademark Office*